United States Patent
Zhang

(10) Patent No.: US 12,254,531 B2
(45) Date of Patent: Mar. 18, 2025

(54) IMAGE COLOR ADJUSTMENT METHOD FOR ELECTRONIC DEVICE AND APPARATUS

(71) Applicant: Huawei Technologies Co., Ltd., Shenzhen (CN)

(72) Inventor: Xiufeng Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/640,042

(22) PCT Filed: Sep. 16, 2020

(86) PCT No.: PCT/CN2020/115445
§ 371 (c)(1),
(2) Date: Mar. 3, 2022

(87) PCT Pub. No.: WO2021/052342
PCT Pub. Date: Mar. 25, 2021

(65) Prior Publication Data
US 2024/0212229 A1    Jun. 27, 2024

(30) Foreign Application Priority Data
Sep. 19, 2019    (CN) .......................... 201910887529.2

(51) Int. Cl.
*G06T 11/00* (2006.01)
*H04N 9/64* (2023.01)

(52) U.S. Cl.
CPC .............. *G06T 11/001* (2013.01); *H04N 9/64* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,626,775 B1 | 4/2017 | Safaee-Rad et al. | |
| 2007/0252849 A1 | 11/2007 | Wang | |
| 2010/0014131 A1 | 1/2010 | Cho | |
| 2013/0286040 A1 | 10/2013 | Kawaguchi | |
| 2014/0152576 A1* | 6/2014 | Kim | G06F 3/0412 345/169 |
| 2016/0148596 A1 | 5/2016 | Bhattacharjee et al. | |
| 2016/0247488 A1* | 8/2016 | McLin | G09G 5/06 |
| 2016/0253981 A1 | 9/2016 | Matsui | |

(Continued)

FOREIGN PATENT DOCUMENTS

| | | |
|---|---|---|
| CN | 101290755 A | 10/2008 |
| CN | 101527122 A | 9/2009 |

(Continued)

*Primary Examiner* — Daniel F Hajnik
*Assistant Examiner* — Jed-Justin Imperial
(74) *Attorney, Agent, or Firm* — Conley Rose, P.C.

(57) ABSTRACT

An electronic device for image color adjustment includes a display and a processor. The processor includes a display processing unit (DPU). The DPU obtains a to-be-displayed image, obtains, based on a first color mode, a target three-dimensional (3D) lookup table used to adjust the to-be-displayed image, maps a color of the to-be-displayed image based on the target 3D lookup table, to obtain an adjusted image, and sends the adjusted image to the display for displaying.

20 Claims, 7 Drawing Sheets

(56) References Cited

U.S. PATENT DOCUMENTS

| | | |
|---|---|---|
| 2017/0301275 A1 | 10/2017 | Wang et al. |
| 2017/0301310 A1 | 10/2017 | Bonnier et al. |
| 2018/0276787 A1* | 9/2018 | Chen .................. G06F 12/0292 |
| 2019/0080656 A1 | 3/2019 | Herranz et al. |

FOREIGN PATENT DOCUMENTS

| | | |
|---|---|---|
| CN | 101631191 A | 1/2010 |
| CN | 104813363 A | 7/2015 |
| CN | 105261326 A | 1/2016 |
| CN | 106782428 A | 5/2017 |
| CN | 107077828 A | 8/2017 |
| CN | 107408373 A | 11/2017 |
| CN | 108701351 A | 10/2018 |

* cited by examiner

IMAGE COLOR ADJUSTMENT METHOD FOR ELECTRONIC DEVICE AND APPARATUS

CROSS-REFERENCE TO RELATED APPLICATIONS

This is a U.S. National Stage of International Patent Application No. PCT/CN2020/115445 filed on Sep. 16, 2020, which claims priority to Chinese Patent Application Ser. No. 201910887529.2 filed on Sep. 19, 2019. Both of the aforementioned applications are hereby incorporated by reference in their entireties.

TECHNICAL FIELD

This application relates to the field of image processing technologies, and in particular, to an image color adjustment method for an electronic device and an apparatus.

BACKGROUND

With development of mobile terminals, more users use mobile terminals to shoot and watch videos. A key factor affecting a video display effect is a color of a video. Different users have different perceptions and hobbies to colors. To meet requirements of different users, the color of the video needs to be adjusted differently. In this way, different requirements of the users are met, and through color adjustment, the video has a special effect color of a movie.

In a conventional technology, only various types of short video software have a color adjustment function. The short video software is software through which a short video can be shot and played, and duration of a short video is usually only from 5 seconds to 5 minutes. Common short video software includes Instagram, TikTok, Meitu Pic, and the like. Currently, all types of short video software can only use a graphics processing unit (Graphics Processing Unit, GPU) to perform color adjustment in a software manner. The GPU is a microprocessor that specially performs image operation on terminal devices, for example, a personal computer, a workstation, a game console, and some mobile devices (such as a tablet computer and a smartphone).

However, due to performance limitation of the GPU, the color adjustment in the software manner cannot implement real-time color adjustment on a high-resolution video and a video with relatively long duration. In addition, real-time color adjustment may cause a significant increase of power consumption of a device. Although the color adjustment in the software manner is applicable to offline color adjustment, duration consumed by color adjustment is relatively long due to the performance limitation of the GPU.

SUMMARY

Embodiments of this application provide an image color adjustment method for an electronic device and an apparatus, to perform color adjustment on a high-resolution long video in real time without increasing power consumption of the electronic device.

A first aspect of this application provides an image color adjustment method for an electronic device. The electronic device includes a display and a processor. The processor includes a display processing unit. The method includes: The display processing unit obtains a to-be-displayed image, obtains, based on a first color mode, a target 3D lookup table used to adjust the to-be-displayed image, maps a color of the to-be-displayed image based on the target 3D lookup table to obtain an adjusted image, and sends the adjusted image to the display for displaying.

In the method, existing color mapping hardware in the DPU is reused to perform color adjustment on an image. This resolves problems of performance and power consumption when color adjustment is performed on a video in an existing software manner, and color adjustment can be performed on a high-resolution long video in real time without increasing power consumption of the electronic device.

In an example manner, before the display processing unit obtains, based on a first color mode, a target 3D lookup table used to adjust the to-be-displayed image, the processor receives a color mode selection operation input by a user, where the first color mode is a color mode selected through the color mode selection operation; and correspondingly, the display processing unit determines, based on the first color mode, an index of the target 3D lookup table corresponding to the first color mode, and searches for the target 3D lookup table based on the index of the target 3D lookup table.

In an example manner, the target 3D lookup table is generated based on a first 3D lookup table and a second 3D lookup table. The first 3D lookup table is used to correct a color of the display, the second 3D lookup table is used to adjust a color of an image, and the second 3D lookup table corresponds to a color mode.

In an example manner, that the display processing unit obtains, based on a first color mode, a target 3D lookup table used to adjust the to-be-displayed image includes: The display processing unit obtains a first 3D lookup table, where the first 3D lookup table is used to correct a color of the display; the display processing unit obtains a second 3D lookup table based on an application that currently plays the to-be-displayed image, where the second 3D lookup table is used to adjust a color of an image played by the application, and a color mode used by the application is the first color mode; and the display processing unit generates the target 3D lookup table based on the first 3D lookup table and the second 3D lookup table. In this manner, a 3D lookup table can be generated in real time according to a user requirement.

In an example manner, that the display processing unit obtains a to-be-displayed image may be: The display processing unit receive the to-be-displayed image that is shot in real time by a camera of the electronic device.

In another example manner, that the display processing unit obtains a to-be-displayed image may be: The display processing unit obtains the to-be-displayed image from a memory.

In an example manner, the method further includes: The display processing unit obtains a first to-be-displayed image, and performs color adjustment on the first to-be-displayed image based on the first 3D lookup table, to obtain an adjusted first to-be-displayed image, where the first 3D lookup table is used to correct the color of the display; and the display processing unit sends the adjusted first to-be-displayed image to the display for displaying. In this manner, the DPU cannot only perform color adjustment on a displayed image based on a color mode, but also reserve an existing function of correcting a color of a display by using DPU hardware. This does not affect existing functions of the DPU.

In an example manner, an internal memory is disposed in the display processing unit, and the target 3D lookup table is stored in the internal memory.

In an example manner, an internal memory is disposed in the display processing unit, and the first 3D lookup table and the second 3D lookup table are stored in the internal memory. Therefore, from the internal memory, the DPU reads a 3D lookup table faster, to further improve color adjustment efficiency.

A second aspect of this application provides an electronic device, including a display and a processor. The processor includes a display processing unit. The display processing unit is configured to: obtain a to-be-displayed image, obtain, based on a first color mode, a target 3D lookup table for adjusting the to-be-displayed image, and map a color of the to-be-displayed image based on the target 3D lookup table, to obtain an adjusted image. The display is configured to display the image adjusted by the display processing unit.

In an example manner, the electronic device further includes an input apparatus. The input apparatus is configured to input, by a user, a color mode selection operation, where the first color mode is a color mode selected through the color mode selection operation. The processor is configured to receive the color mode selection operation input by the user by using the input apparatus. The display processing unit is specifically configured to: determine, based on the first color mode, an index of the target 3D lookup table corresponding to the first color mode; and search for the target 3D lookup table based on the index of the target 3D lookup table.

In an example manner, the target 3D lookup table is generated based on a first 3D lookup table and a second 3D lookup table. The first 3D lookup table is used to correct a color of the display, the second 3D lookup table is used to adjust a color of an image, and the second 3D lookup table corresponds to a color mode.

In an example manner, the display processing unit is specifically configured to: obtain a first 3D lookup table, where the first 3D lookup table is used to correct a color of the display; obtain a second 3D lookup table based on an application that currently plays the to-be-displayed image, where the second 3D lookup table is used to adjust a color of an image played by the application, and a color mode used by the application is the first color mode; and generate the target 3D lookup table based on the first 3D lookup table and the second 3D lookup table.

In an example manner, the electronic device further includes a camera. The camera is configured to shoot the to-be-displayed image. The display processing unit is specifically configured to receive the to-be-displayed image that is shot in real time by the camera.

In an example manner, the electronic device further includes a memory. The memory is configured to store the to-be-displayed image. The display processing unit is specifically configured to obtain the to-be-displayed image from the memory.

In an example, the display processing unit is further configured to: obtain a first to-be-displayed image, and perform color adjustment on the first to-be-displayed image based on the first 3D lookup table, to obtain an adjusted first to-be-displayed image. The first 3D lookup table is used to correct the color of the display. The display is further configured to display the first to-be-displayed image adjusted by the display processing unit.

In an example manner, an internal memory is disposed in the display processing unit, and the target 3D lookup table is stored in the internal memory.

In another example manner, an internal memory is disposed in the display processing unit, and the first 3D lookup table and the second 3D lookup table are stored in the internal memory.

A third aspect of this application provides a circuit system. The circuit system includes a display processing unit, configured to: obtain a to-be-displayed image; obtain, based on a first color mode, a target 3D lookup table used to adjust the to-be-displayed image; map a color of the to-be-displayed image based on the target 3D lookup table, to obtain an adjusted image; and send the adjusted image to a display connected to the circuit system for displaying.

In an example manner, the system further includes a first processor. The first processor is configured to receive a color mode selection operation input by a user, where the first color mode is a color mode selected through the color mode selection operation. The display processing unit is specifically configured to: determine, based on the first color mode, an index of the target 3D lookup table corresponding to the first color mode; and search for the target 3D lookup table based on the index of the target 3D lookup table.

In an example manner, the target 3D lookup table is generated based on a first 3D lookup table and a second 3D lookup table. The first 3D lookup table is used to correct a color of the display, the second 3D lookup table is used to adjust a color of an image, and the second 3D lookup table corresponds to a color mode.

In an example manner, the display processing unit is specifically configured to: obtain a first 3D lookup table, where the first 3D lookup table is used to correct a color of the display; obtain a second 3D lookup table based on an application that currently plays the to-be-displayed image, where the second 3D lookup table is used to adjust a color of an image played by the application, and a color mode used by the application is the first color mode; and generate the target 3D lookup table based on the first 3D lookup table and the second 3D lookup table.

In an example manner, the display processing unit is specifically configured to receive the to-be-displayed image that is shot in real time by a camera connected to the circuit system. In another example manner, the circuit system further includes a memory. The memory is configured to store the to-be-displayed image. The display processing unit is specifically configured to obtain the to-be-displayed image from the memory.

In an example, the display processing unit is further configured to: obtain a first to-be-displayed image; perform color adjustment on the first to-be-displayed image based on the first 3D lookup table, to obtain an adjusted first to-be-displayed image, where the first 3D lookup table is used to correct the color of the display; and send the adjusted first to-be-displayed image to the display.

In an example manner, an internal memory is disposed in the display processing unit, and the target 3D lookup table is stored in the internal memory.

In another example manner, an internal memory is disposed in the display processing unit, and the first 3D lookup table and the second 3D lookup table are stored in the internal memory.

According to the image color adjustment method for the electronic device and the apparatus, provided in the embodiments of this application, the DPU of the electronic device obtains the to-be-displayed image, obtains, based on the first color mode, the target 3D lookup table used to adjust the to-be-displayed image, maps the color of the to-be-displayed image based on the target 3D lookup table, to obtain the adjusted image, and sends the adjusted image to the display for displaying. In this solution, existing color mapping hardware in the DPU is reused to perform color adjustment on an image. This resolves problems of performance and power consumption when color adjustment is performed on a video in an existing software manner, and color adjustment can be performed on a high-resolution long video in real time without increasing power consumption of the electronic device.

DESCRIPTION OF EMBODIMENTS

This application provides an image color adjustment method for an electronic device. The electronic device may be a mobile phone, a tablet computer, a desktop computer, a laptop computer, a handheld computer, a notebook computer, a netbook computer, a cellular phone, a cordless phone, a session initiation protocol (Session Initiation Protocol. SIP) phone, a personal digital assistant (Personal Digital Assistant, PDA), a vehicle-mounted device, a wearable device, or the like. A specific form of a terminal device is not limited in the embodiments of this application.

Figure 1:
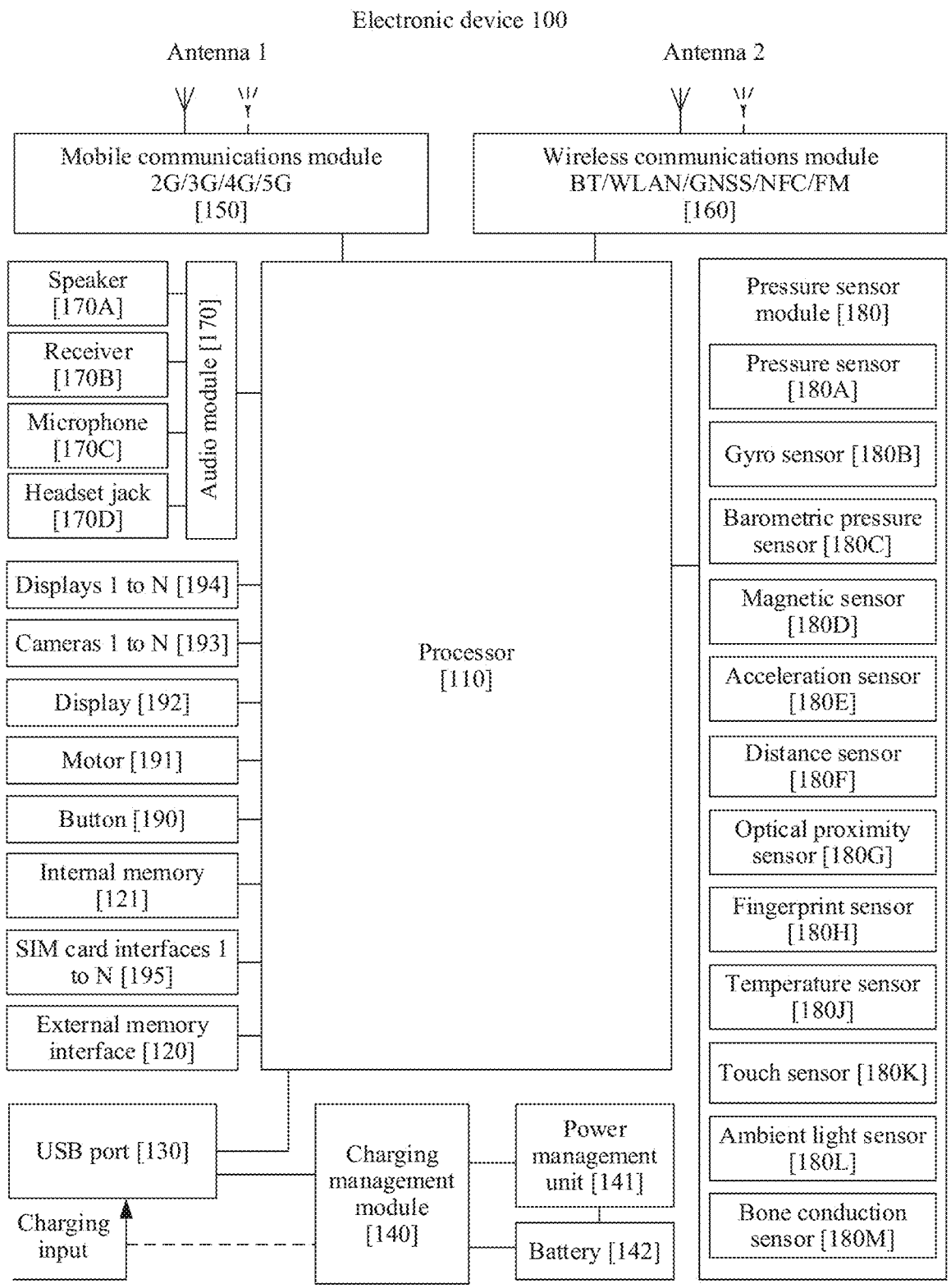
FIG. 1 is a schematic structural diagram of an electronic device to which this application is applicable.

FIG. 1 is a schematic structural diagram of an electronic device to which this application is applicable. As shown in FIG. 1, the electronic device 100 may include: a processor 110, an external memory interface 120, an internal memory 121, a universal serial bus (universal serial bus, USB) port 130, a charging management module 140, a power management unit 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identification module (subscriber identification module, SIM) card interface 195, and the like. It may be understood that an example structure in this embodiment does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit. GPU), an image signal processor (image signal processor. ISP), a controller, a video codec, a digital signal processor (digital signal processor, DSP), a baseband processor, a display processing unit (display processing unit, DPU), a neural-network processing unit (neural-network processing unit. NPU), and/or the like. Different processing units may be independent components, or may be integrated into one or more processors. In some embodiments, the electronic device 100 may alternatively include one or more processors 110. The controller may be a nerve center and a command center of the electronic device 100. The controller may generate an operation control signal based on instruction operation code and a time sequence signal, to complete control of instruction reading and instruction execution. The memory may further be disposed in the processor 110, and is configured to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency of the electronic device 100.

In some embodiments, the processor 110 may include one or more interfaces. The interface may include an inter-integrated circuit (inter-integrated circuit, 12C) interface, an inter-integrated circuit sound (inter-integrated circuit sound, 12S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like. The USB port 130 is an interface that complies with a USB standard specification, and may be specifically a mini USB port, a micro USB port, a USB Type-C port, or the like. The USB port 130 may be configured to connect to the charger to charge the electronic device 100, or may be used for data transmission between the electronic device 100 and a peripheral device, or may be configured to connect to a headset, to play audio by using the headset.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the electronic device 100. The charging management module 140 supplies power to the electronic device 100 by using the power management unit 141 while charging the battery 142.

The power management unit 141 is configured to connect to the battery 142, the charging management module 140, and the processor 110. The power management unit 141 receives an input from the battery 142 and/or the charging management module 140, and supplies power to the processor 110, the internal memory 121, the display 194, the camera 193, the wireless communications module 160, and the like. The power management unit 141 may further be configured to monitor parameters such as a battery capacity, a battery cycle count, and a battery health status (electric leakage or impedance). In some other embodiments, the power management unit 141 may alternatively be disposed in the processor 110. In some other embodiments, the power management unit 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G/3G/4G/5G and the like. The mobile communications module 150 may include at least one filter, a switch, a power amplifier, a low noise amplifier, and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions that are applied to the electronic device 100, for example, wireless local area network (wireless local area networks, WLAN), Bluetooth, global navigation satellite system (global navigation satellite system, GNSS), frequency modulation (frequency modulation, FM), NFC, and infrared (infrared, IR) technologies. The wireless communications module 160 may be one or more devices that integrate at least one communications processing module. The wireless communications module 160 receives an electromagnetic wave by using the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a GSM, a GPRS, CDMA, WCDMA, TD-SCDMA, LTE, a GNSS, a WLAN, NFC. FM, an IR technology, and/or the like. The GNSS may include a global positioning system (global positioning system, GPS), a global navigation satellite system (global navigation satellite system, GLONASS), a BeiDou navigation satellite system (beidou navigation satellite system. BDS), a quasi-zenith satellite system (quasi-zenith satellite system, QZSS), and/or satellite based augmentation systems (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may use a liquid crystal display (liquid crystal display. LCD), an organic light-emitting diode (organic light-emitting diode, OLED), an active-matrix organic light-emitting diode or an active-matrix organic light-emitting diode (active-matrix organic light emitting diode, AMOLED), a flex light-emitting diode (flex light-emitting diode, FLED), a Miniled, a MicroLed, a Micro-oLed, a quantum dot light-emitting diode (quantum dot light emitting diodes, QLED), or the like. In some embodiments, the electronic device 100 may include one or N displays 194, where N is a positive integer greater than 1.

The electronic device 100 can implement a shooting function by using the ISP, one or more cameras 193, the video codec, the GPU, one or more displays 194, the application processor, and the like.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, can be implemented by using the NPU.

The DPU is also referred to as a display subsystem (Display Sub-System, DSS). The DPU is configured to adjust a color of the display 194, and the DPU may adjust the color of the display by using a 3D lookup table (3D look up table, 3D LUT). The DPU may also perform processing such as scaling, noise reduction, contrast enhancement, backlight brightness management, HDR processing, and display parameter Gamma adjustment on an image.

The external memory interface 120 may be configured to connect to an external storage card, for example, a micro SD card, to extend a storage capability of the electronic device 100.

The external storage card communicates with the processor 110 through the external memory interface 120, to implement a data storage function. For example, data files such as music, photos, videos are stored in the external storage card.

The internal memory 121 may be configured to store one or more computer programs, where the one or more computer programs include instructions. The processor 110 runs the instructions stored in the internal memory 121, to enable the electronic device 100 to perform various function applications, data processing, and the like. The internal memory 121 may include a program storage area and a data storage area. The program storage area may store an operating system. The program storage area may further store one or more applications (for example, a gallery and a contact), and the like. The data storage area may store data (for example, a photo and a contact) created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS). In some embodiments, the processor 110 runs the instructions stored in the internal memory 121 and/or the instructions stored in the memory disposed in the processor 110, to enable the electronic device 100 to perform various function applications and data processing.

The electronic device 100 may implement audio functions, for example, music playback and recording, by using the audio module 170, the speaker 170A, the receiver 170B, the microphone 170C, the headset jack 170D, the application processor, and the like. The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110. The speaker 170A, also referred to as a "horn", is configured to convert an audio electrical signal into a sound signal. The electronic device 100 may be configured to listen to music or answer a hands-free call by using the speaker 170A. The receiver 170B, also referred to as an "earpiece", is configured to convert an audio electrical signal into a sound signal. When a call is answered or voice information is received by using the electronic device 100, the receiver 170B may be put close to a human ear to receive a voice. The microphone 170C, also referred to as a "mike" or a "voice tube", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like. The headset jack 170D is configured to connect to a wired headset. The headset jack 170D may be the USB port 130 or a 3.5 mm open mobile terminal platform (open mobile terminal platform, OMTP) standard interface or a cellular telecommunications industry association of the USA (cellular telecommunications industry association of the USA, CTIA) standard interface.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensities may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during shooting. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyro sensor 180B may further be used in navigation and motion sensing game scenarios.

The acceleration sensor 180E may detect accelerations in various directions (usually on three axes) of the electronic device 100, and may detect magnitude and a direction of gravity when the electronic device 100 is still. The acceleration sensor 180E may further be configured to identify a posture of the electronic device, and is applied to switching between a landscape mode and a portrait mode, and applications such as a pedometer.

The distance sensor 180F is configured to measure a distance. The electronic device 100 may measure a distance by using infrared or laser. In some embodiments, in a shooting scenario, the electronic device 100 may measure a distance by using the distance sensor 180F, to implement fast focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock the screen in a leather case mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during shooting. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access locking, fingerprint-based shooting, fingerprint-based call answering, and the like by using a feature of the collected fingerprint. In addition, for other records about the fingerprint sensor, refer to the international patent application PCT/CN2017/082773 entitled "NOTIFICATION PROCESSING METHOD AND ELECTRONIC DEVICE", which is incorporated herein by reference in its entirety.

The touch sensor 180K is also referred to as a "touch panel". The touch sensor 180K may be disposed in the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. A visual output related to the touch operation may be provided by using the display 194. In some other embodiments, the touch sensor 180K may alternatively be disposed on a surface of the electronic device 100, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards can be simultaneously inserted into the same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

Figure 2:
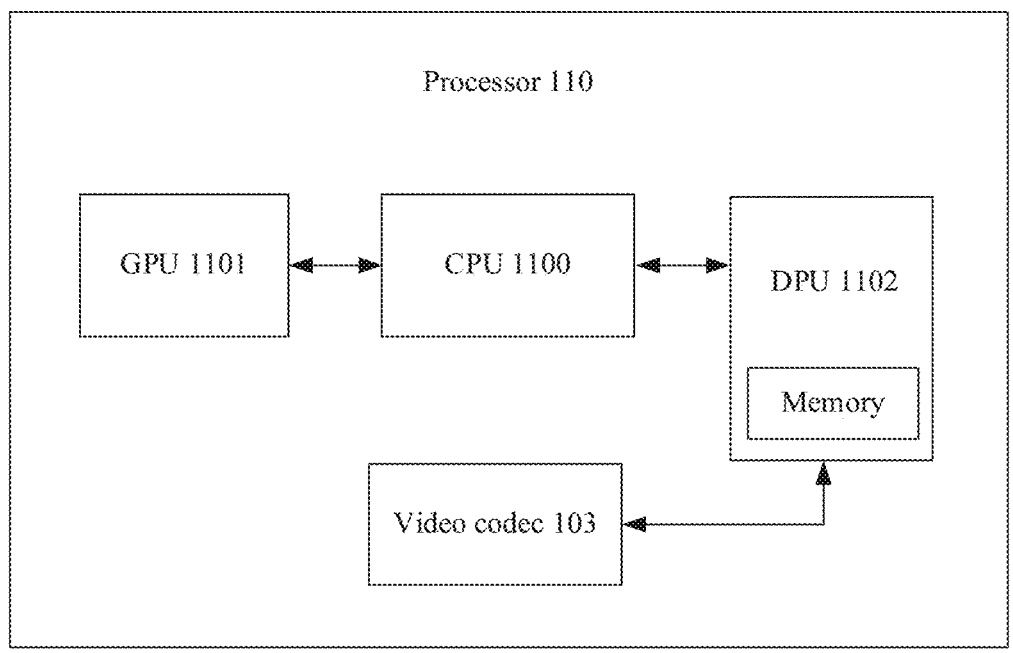
FIG. 2 is a schematic structural diagram of a processor to which this application is applicable.

FIG. 2 is a schematic structural diagram of a processor to which this application is applicable. As shown in FIG. 2, the processor 110 includes a CPU 1100, a GPU 1101, a DPU 1102, and a video codec 1103, which can be connected through buses inside the processor 110.

For functions of the CPU 1100, the GPU 1101, and the video codec 1103, refer to the foregoing related descriptions. Details are not described herein again. A method in this embodiment of this application is performed by the DPU 1102. Currently, the DPU 1102 is mainly configured to adjust a color of the display 194, and the DPU 1102 may adjust, by using a 3D lookup table, a color of an image output by the electronic device. The DPU may also perform processing such as scaling, noise reduction, contrast enhancement, backlight brightness management, HDR processing, and Gamma adjustment on an image.

A memory, also referred to as an internal memory, is disposed in the DPU 1102 and is configured to store instructions and data for the DPU to perform a corresponding function. For example, if the DPU 1102 needs to adjust a color of the display 194, a 3D lookup table may be stored in the internal memory of the DPU 1102, and in a color adjustment process, the DPU 1102 directly reads the 3D lookup table from the internal memory; and does not need to read the 3D lookup table from another memory of the electronic device.

The 3D lookup table is a technical means of color calibration (or referred to as hue calibration). In one aspect, to avoid color differences of an image displayed on different display devices, the International Telecommunication Union (International Telecommunication Union, ITU for short) and the Society of Motion Picture and Television Engineers (Society of Motion Picture and Television Engineers, SMPTE for short) formulate a series of standards. ITU-Rec 709, also referred to as a high definition standard, is a most widely used standard for high definition televisions (High Definition Television, HDTV) This standard clearly specifies a displayed color gamut, a color temperature, and a gamma (gamma) value. Therefore, in the broadcast and television industry, to implement high-definition displaying, a display device needs to meet these parameters, namely, the color gamut, the color temperature, and the gamma value specified in this standard, so that colors of a same material displayed on different display devices are consistent. In another aspect, in a display manufacturing process, it is impossible for a display manufacturer to manufacture displays only according to the standard in the broadcast and television industry, and they can only manufacture the displays as good as possible with reference to costs and techniques. Consequently, colors represented by different displays vary greatly. The display device manufacturer needs to consider that colors displayed on different screens need to be consistent and comply with the standard. Therefore, color calibration is required. There are various technical means for color calibration, where a 3D lookup table is currently best and most widely used technical means. The 3D lookup table is applicable to accurate color adjustment from simple color adjustment such as a gamma value, a color range, and error tracking to advanced correction such as a non-linear attribute, color crosstalk, a hue, a saturation, a brightness, and the like.

Existing displays mostly use an R (red) G (green) B (blue) color standard. All colors on the display can be obtained by mixing three colors, namely, red, green, and blue, according to different ratios. A group of RGB values is a minimum display unit, and any color on the display can be represented by a group of RGB values.

A "quantity" or "size" of RGB is brightness of a color, and values of R, G, and B are integers. Currently, the RGB respectively indicate 256 brightness levels that are represented by numbers: 0, 1, 2 . . . , and 255. Through computation, RGB colors of 256 levels can form totally about 16.78 million types of colors in a combination manner, that is, 256×256×256=16777216.

Figure 3:
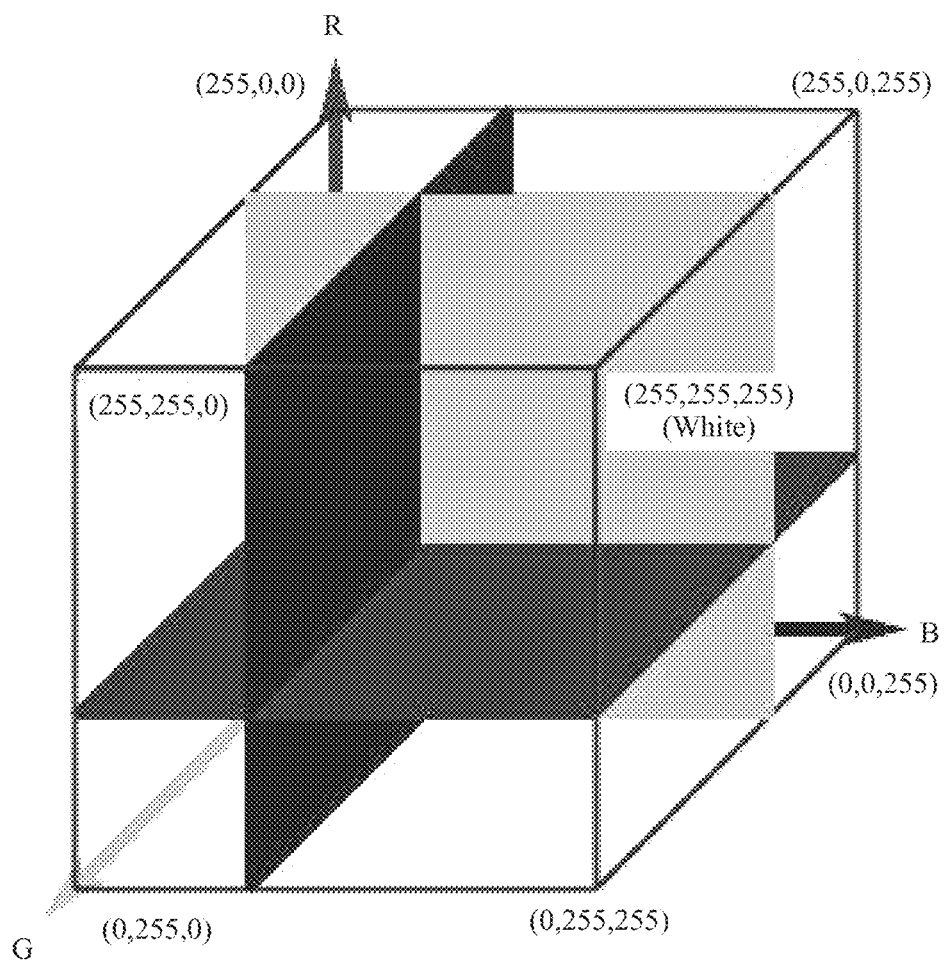
FIG. 3 is a schematic diagram of RGB color space.

A 3D lookup table is used to indicate a mapping relationship between all colors, and the 3D lookup table indicates the mapping relationship of the colors by using an RGB mapping relationship. RGB may be used as three dimensions to establish a mapping space. As shown in FIG. 3, R, G, and B are respectively valued from 0 to 255, different points in a three-dimensional space represent different colors, and can totally represent 256×256×256=16777216 types of colors.

During actual application, a size of a 3D lookup table may be set according to a color requirement of a user, and 256 brightness levels on three channels R, G, and B may be sampled. For example, if a sampling interval is 16, the 3D lookup table shown in FIG. 3 may represent 17×17×17 types of colors in total.

The working principle of the 3D lookup table is as follows: an RGB value of an input pixel is R1G1B1, and through mapping in a 3D lookup table, the RGB value of the pixel change to R1'G1'B1'. The R1'G1'B1' obtained through mapping are also an RGB signal. However, the R1'G1'B1' signal is slightly different from an R1G1B1 input signal, and color effects of the R1'G1'B1' and the R1G1B1 displayed on the display are also different, where the color effect that is of the R1'G1'B1' obtained through transformation and that is displayed on the display better meets a user requirement. This is a function of the 3D lookup table and is equivalent to calibrating the deviation of the display.

Figure 4:
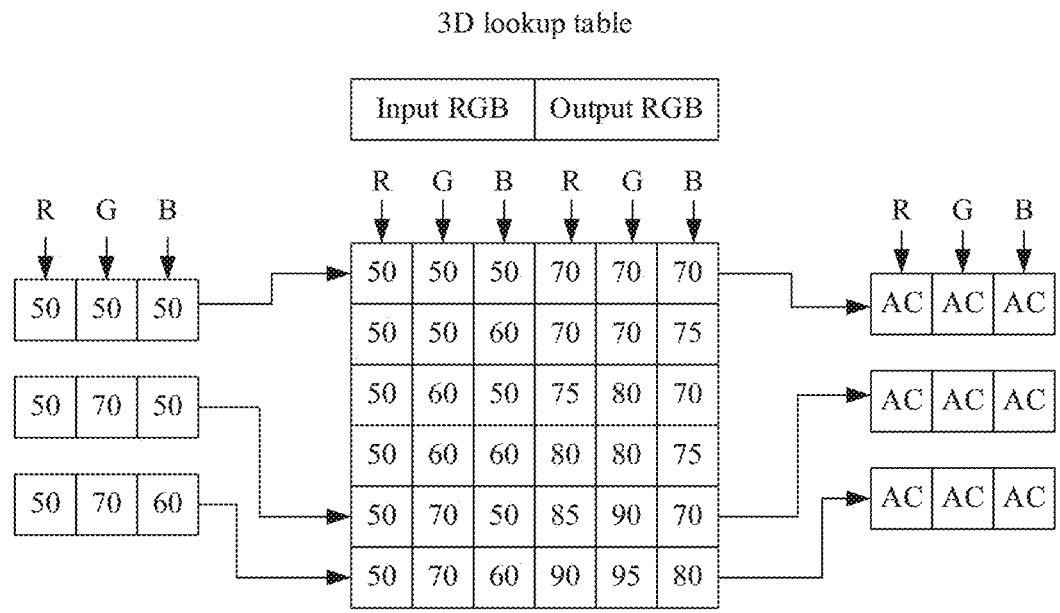
FIG. 4 is a schematic diagram of a principle of a 3D lookup table.

FIG. 4 is a schematic diagram of a principle of a 3D lookup table. As shown in FIG. 4, in the 3D lookup table, each input RGB uniquely corresponds to an output RGB. For example, when an input RGB is (50, 50, 50), an output RGB is (70, 70, 70); when the input RGB is (50, 70, 50), the output RGB is (85, 90, 70); and when the input RGB is (50, 70, 60), the output RGB is (90, 95, 80).

For example, if a white color of a gray scale 128 (an input RGB=128) needs to be displayed, a gray scale of a white color displayed on a display also needs to be 128 in an ideal state. However, the gray scale displayed on the display is only 120 due to inaccuracy of the display. As a result, there is a deviation of eight gray scales, the 3D LUT is used to add the deviation to or subtract the deviation from the input RGB signal based on this deviation of the display, to implement that a final displayed effect is the same as the input effect. It may be understood that this is merely an example, and a process in which a mapping module performs color adjustment according to a 3D lookup table may be very complex. Not only a deviation is added to or subtracted from an original RGB, but also different adjustment may be performed based on different input RGB signals. This is not limited in this embodiment.

The image color adjustment method provided in this embodiment of this application is performed by a DPU. To be specific, in the solution of this application, color adjustment is implemented by using hardware. An advantage of hardware-based color adjustment is as follows: After adjusting RGB values of each pixel in a video, the DPU does not need to write an adjusted pixel value into a memory, but directly sends the adjusted pixel value to a display for displaying, to increase a color mapping speed, so that color adjustment can be implemented on a high-resolution video in real time. However, in an existing solution of software-based color adjustment, after adjusting RGB values of a pixel, a GPU needs to write an adjusted pixel value into the memory, the display reads the adjusted pixel value from the memory and then displays the pixel value. In this way, color adjustment can be performed in real time only on a short video with a relatively low resolution.

The image color adjustment method provided in this embodiment of this application may be used to perform color adjustment on a video image played by a video player installed in an electronic device, may further perform color adjustment on a photo or a video stored in an album of the electronic device, may further perform color adjustment on a video or a photo that is being shot by a camera of the electronic device, may further perform color adjustment on a short video application installed on the electronic device, and may further perform color adjustment on a desktop of the electronic device.

Using a video player as an example, the video player may provide one or more color modes for a user to select. When the video player provides only one color mode, the video player adjusts a video image to have a color effect corresponding to the color mode by default. When the video player provides a plurality of color modes, the user may select a color mode before video playing or during video playing, and the video player adjusts a video image to have a color effect corresponding to the color mode selected by the user.

Similarly, the album, camera, short video application, and the like may also provide one or more color modes for the user to select. The video player, camera, and short video application may perform color adjustment on an image online in real time, and the album usually performs color adjustment on the image offline.

In this embodiment of this application, the color mode may be understood as a color effect of an image presented on a display. A same image presents different color effects to the user after being processed in different color modes. In this embodiment of this application, a plurality of colors may be provided for the user to select, to meet personalized image color requirements of different users.

The color mode may be a filter in an existing image processing (Photoshop) application or an image beautification application. The color mode may be, for example, retro, black and white, dusk, dawn, sunshine, warm, cool, orange, or amber.

Figure 5:
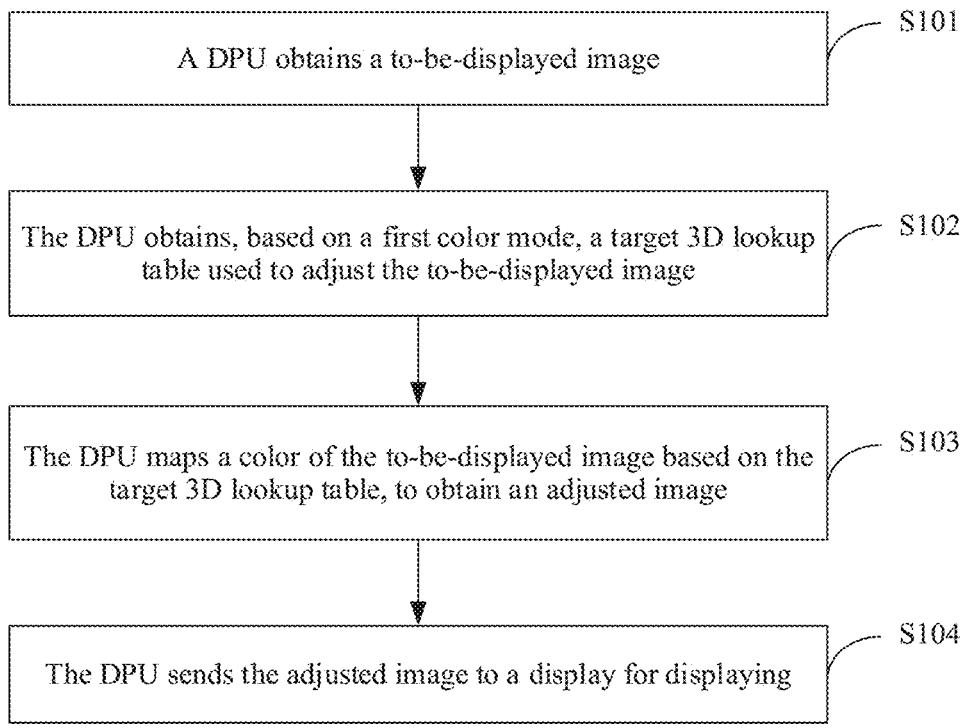
FIG. 5 is a flowchart of an image color adjustment method for an electronic device according to embodiment 1 of this application.

FIG. 5 is a flowchart of an image color adjustment method for an electronic device according to embodiment 1 of this application. The method is applied to the electronic device, the electronic device includes a display and a processor, and the processor includes a DPU.

The electronic device stores a 3D lookup table. In this embodiment of this application, the 3D lookup table stored in the electronic device is classified into two types: One type of 3D lookup table corresponds to a color mode, and this type of 3D lookup table is used in a scenario in which color adjustment needs to be performed on an image. Generally, each color mode corresponds to one 3D reference table. When there are a plurality of color modes, the electronic device needs to store a plurality of such types of 3D lookup tables. Another type of 3D lookup table is unrelated to the color mode, and this type of 3D lookup table is used to perform color adjustment on a display of the electronic device. Generally, only one 3D lookup table of this type is required. This type of 3D lookup table may be used to perform color correction on all images displayed on the display.

In this embodiment of this application, an internal memory may be disposed in the DPU and can be invoked only by the DPU, where the internal memory may be a random access memory (Random Access Memory, RAM). The 3D lookup table may be stored in the internal memory.

Certainly, the 3D lookup table may alternatively be stored in another memory outside the DPU This is not limited in this embodiment of this application. When the 3D lookup table is stored in the internal memory of the DPU, the DPU reads the 3D lookup table from the internal memory faster, to further improve color adjustment efficiency. As shown in FIG. 5, the method provided in this embodiment includes the following steps S101: The DPU obtains a to-be-displayed image.

In this embodiment, the to-be-displayed image is all content that can be displayed on the display, including but not limited to a video, an image, a game, and the like. The video may be a long video (for example, a movie, or a TV series), or may be a short video (for example, a video whose playing duration is less than 5 minutes).

In this embodiment, the to-be-displayed image may be obtained in the following several manners:

In a manner, the DPU receives a to-be-displayed image that is shot in real time by a camera of the electronic device, where the camera may be a camera on the electronic device, and the image shot by the camera is sent to the DPU after being processed by a video codec.

In another manner, the DPU reads a to-be-displayed image from a memory, where the to-be-displayed image is downloaded by the electronic device from a server to the memory. For example, when a user watches a video in real time by using a video player, the video is first downloaded to the memory during video playing, and the DPU reads a to-be-displayed image from the memory, processes the to-be-displayed image, and then sends a processed to-be-displayed image to the display for displaying.

In still another manner, the DPU reads a to-be-displayed image from a memory of the electronic device. To be specific, a shot image is stored in the memory of the electronic device in advance, or is downloaded from a server and stored in the memory of the electronic device in advance.

In this embodiment of this application, the to-be-displayed image may be an existing image with any resolution, for example, an image of a 4K or 2K high-resolution video. A resolution of the 4K video may reach 3840×2140, a resolution of the 2K video is 1920×1080, and the 2K video is also referred to as a full HD video. The resolution of the 4K video is four times that of the full HD video and nine times that of an HD video (whose resolution is 1280×720).

In addition, a video format is not limited in this embodiment of this application. The video format may be a moving picture experts group format (Moving Picture Experts Group. MPEG), MPEG-1, MPEG-2, MPEG-3, or the like, or may be an audio video interleaved (Audio Video Interleaved, AVI) format, an advanced streaming format (Advanced Streaming Format), or the like, or may be a high-dynamic range image (High-Dynamic Range, HDR), where the HDR may include the following four standards: HDR10, HDR10+, HLG (Hybrid Log Gamma, HLG), and Dolby vision (dolby vision).

S102. The DPU obtains, based on a first color mode, a target 3D lookup table used to adjust the to-be-displayed image.

In one manner, a plurality of 3D lookup tables are stored in the electronic device, each 3D lookup table corresponds to one color mode, each 3D lookup table may have one index, and the index can uniquely identify one 3D lookup table and one color mode. The color mode is used to implement various color effects of an image. Currently, a plurality of pieces of image processing software provides a plurality of color modes for a user to select. The user may select a corresponding color mode according to a preference of the user for the image. Different color modes correspond to different color effects. A same image has different color effects after beings processed in different color modes.

In some embodiments, the processor receives a color mode selection operation input by a user, where the color mode selection operation is used to select a first color mode from a plurality of color modes. The DPU determines, based on the first color mode, an index of the target 3D lookup table corresponding to the first color mode, and searches for the target 3D lookup table based on the index of the target 3D lookup table.

Figure 6:
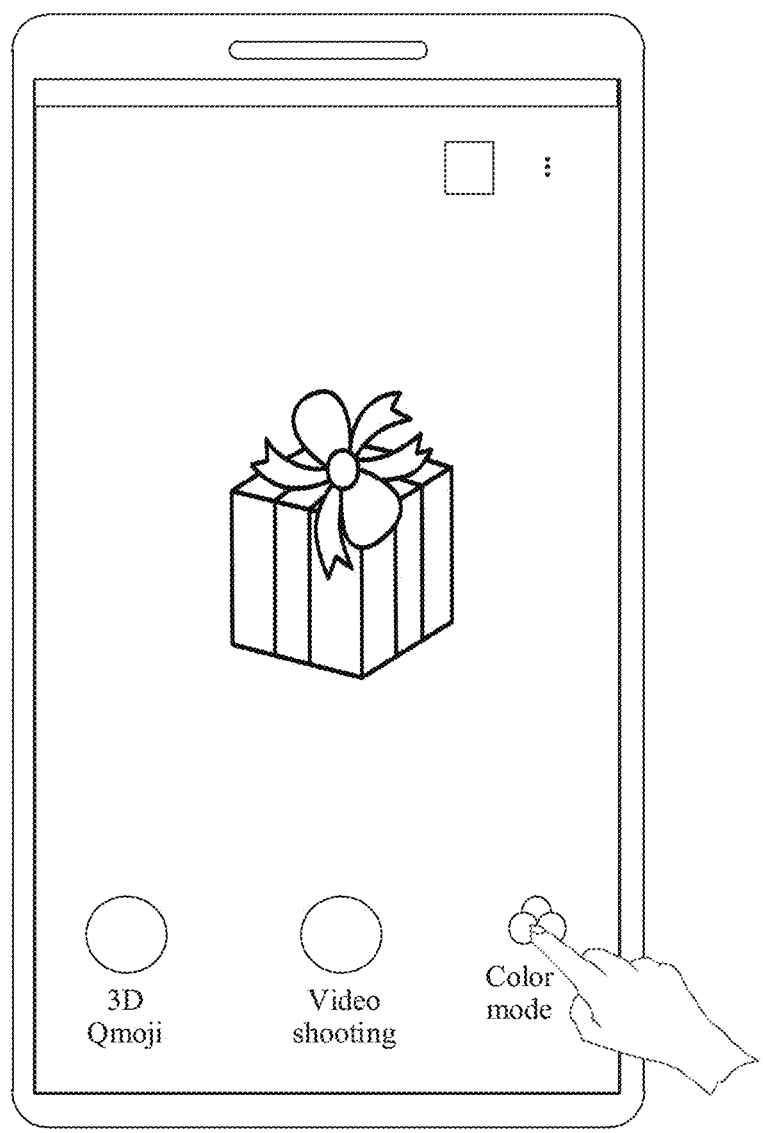
FIG. 6 is a schematic diagram of a shooting page.

FIG. 6 is a schematic diagram of a shooting page. As shown in FIG. 6, after a user opens image processing software, a shooting mode is enabled. On the shooting page, a plurality of shooting modes are displayed for the user to select, such as a common shooting mode, a video mode, and a 3D Qmoji mode. The common shooting mode is used to shoot a common photo, the video mode is used to shoot a video, and the 3D Qmoji mode is used to shoot a photo with some special effects, where the special effects may be understood as obtained by superimposing special effects on a common photo. The user may select different shooting modes by tapping buttons corresponding to the different shooting modes.

Figure 7:
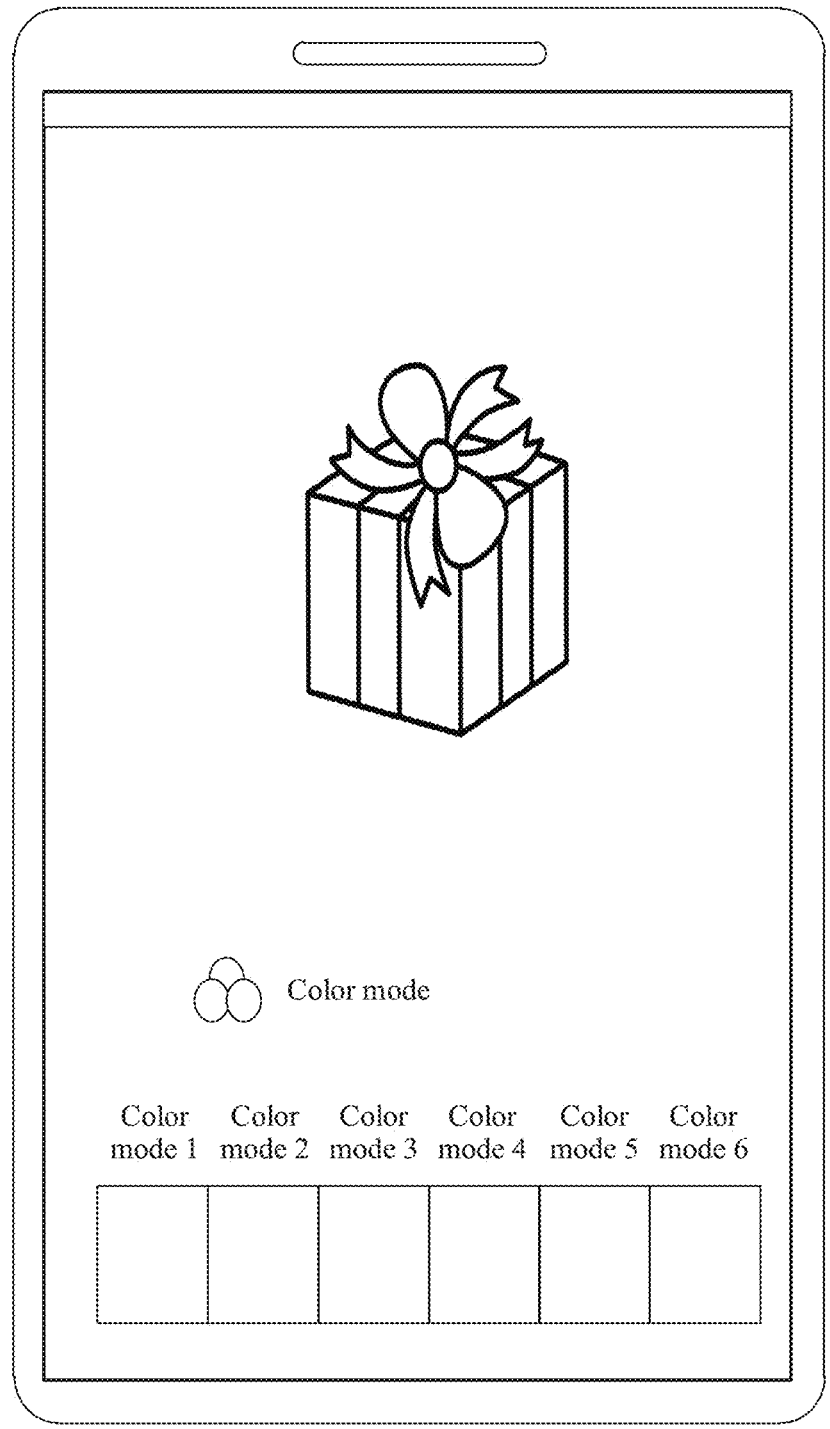
FIG. 7 is a schematic diagram of a color mode selection page.

Referring to FIG. 6, the shooting page further includes a color mode selection control. After the user taps the color mode selection control, a color mode selection page shown in FIG. 7 is displayed. As shown in FIG. 7, effects and names of a plurality of color modes are displayed on the color mode selection page. A quantity of the color modes that can be displayed on a one-screen page is limited. Therefore, in an electronic device with a touchscreen, the user can further slide leftwards or rightwards in a color mode effect display area, to display more color modes. Alternatively, there is a "More" control on the color mode selection page. The user can tap the "More" control to jump to a subpage on which more color modes are displayed for the user to select.

After the user selects the first color mode, the DPU receives the color mode selection operation of the user, can learn of, through the color mode selection operation, the first color mode selected by the user, and can obtain, based on a correspondence between the first color mode and the 3D lookup table, an index of a target 3D lookup table corresponding to the first color mode.

It should be noted that the 3D lookup table stored in the electronic device is generated based on a first 3D lookup table and a second 3D lookup table, the first 3D lookup table is used to correct a color of the display, the second 3D lookup table is used to adjust a color of an image, and each second 3D lookup table corresponds to one color mode.

Color correction on the display is considered when the 3D lookup table is obtained based on the first 3D lookup table and the second 3D lookup table, so that an image on which color adjustment is performed based on the 3D lookup table cannot only meet a personalized color requirement of the user, but also eliminate impact of a display difference on the color.

In principle, the 3D lookup table in this embodiment of this application is equivalent to two times of color adjustment performed on the to-be-displayed image. It is assumed that one pixel in the to-be-displayed image is represented as RGB, and first color adjustment is performed on the RGB based on the second 3D lookup table to obtain R'G'B', and then second color adjustment is performed on the R'G'B' based on the first 3D lookup table to obtain R"G"B". In the solution of this embodiment of this application, the R"G"B" may be obtained by adjusting the RGB once by using the 3D lookup table.

In another manner, the DPU obtains a first 3D lookup table from the memory of the electronic device, where the first 3D lookup table is used to correct a color of the display; the DPU obtains a second 3D lookup table based on an application that currently plays the to-be-displayed image, where the second 3D lookup table is used to adjust a color of an image played by the application, and the color mode used by the application is the first color mode; and the DPU generates the target 3D lookup table based on the first 3D lookup table and the second 3D lookup table. The color mode used by the application may be a default color mode of the application, or may be a color mode specified by the user.

In this manner, the first 3D lookup table is a fixed 3D lookup table that exists in the electronic device, the second 3D lookup table varies with an application, and different color adjustment solutions are defined for different applications according to actual requirements. For example, video playing software A uniformly performs color adjustment on all videos in a color mode 1, and video playing software B uniformly performs color adjustment on all videos in a color mode 2. In this scenario, when a user opens an application to play a video, the DPU generates a target 3D lookup table based on a second 3D lookup table corresponding to the application and the first 3D lookup table, where color correction on the display is considered in the generated target 3D lookup table.

Optionally, after generating the target 3D search table based on the first 3D search table and the second 3D search table, the DPU may store the target 3D search table in a memory of the electronic device. The target 3D reference table is in a one-to-one correspondence with an application. When a user subsequently uses the application to play a video, the target 3D lookup table may be found based on an application identifier.

S103. The DPU maps a color of the to-be-displayed image based on the target 3D lookup table, to obtain an adjusted image.

An example in which the to-be-displayed image is a video or a game is used. The video or the video includes a plurality of frames of images. Each frame of image includes a plurality of pixels. A quantity of the pixels in each frame of image is related to a resolution. The DPU maps RGB of each pixel in the image based on the 3D lookup table, to obtain a mapped RGB value of each pixel. It may be understood that some pixels in the to-be-displayed image can be directly mapped by using a 3D lookup table, and some other pixels cannot be mapped by using the 3D lookup table. In this case, mapped values of this type of pixels need to be obtained in an interpolation manner. A mapped value of a pixel can be obtained through conventional cube interpolation or tetrahedron interpolation.

S104: The DPU sends the adjusted image to the display for displaying.

It may be understood that, when the to-be-displayed image is a video, the DPU processes an image in the video frame by frame in sequence, and after performing color mapping on a current frame, the DPU sends a mapped image to the display for displaying.

In this embodiment, the DPU directly sends each adjusted frame of image to the display for displaying, and does not need to write, to the memory, RGB that is of each adjusted frame of image and that is obtained through mapping.

It should be noted that, in this embodiment of this application, the electronic device still stores a first 3D lookup table, where the first 3D lookup table is used to correct a color of the display, that is, an existing function of the electronic device for correcting a color of a display is retained. Correspondingly, the DPU obtains the first to-be-displayed image, and performs color adjustment on the first to-be-displayed image based on the first 3D lookup table, to obtain an adjusted first to-be-displayed image. The DPU sends the adjusted first to-be-displayed image to the display for displaying. In this solution, the DPU performs only display color correction on the first to-be-displayed content, and does not perform color adjustment based on the color mode.

In the solution of this embodiment, existing DPU hardware is reused to adjust a color of a to-be-displayed image, and a rate of color mapping is increased by using hardware to perform color adjustment, so that color adjustment can be performed on a high-definition video in real time, and a function of the existing DPU hardware for correcting a color of a display is retained. In addition, power consumption of the electronic device is not increased.

In this embodiment, the DPU of the electronic device obtains a to-be-displayed image, obtains, based on a first color mode, a target 3D lookup table used to adjust the to-be-displayed image, maps a color of the to-be-displayed image based on the target 3D lookup table, to obtain an adjusted image, and sends the adjusted video to the display for displaying. In this solution, existing color mapping hardware in the DPU is reused to perform color adjustment on an image. This resolves problems of performance and power consumption when color adjustment is performed on a video in an existing software manner, and color adjustment can be performed on a high-resolution long video in real time without increasing power consumption of the electronic device.

Figure 8:
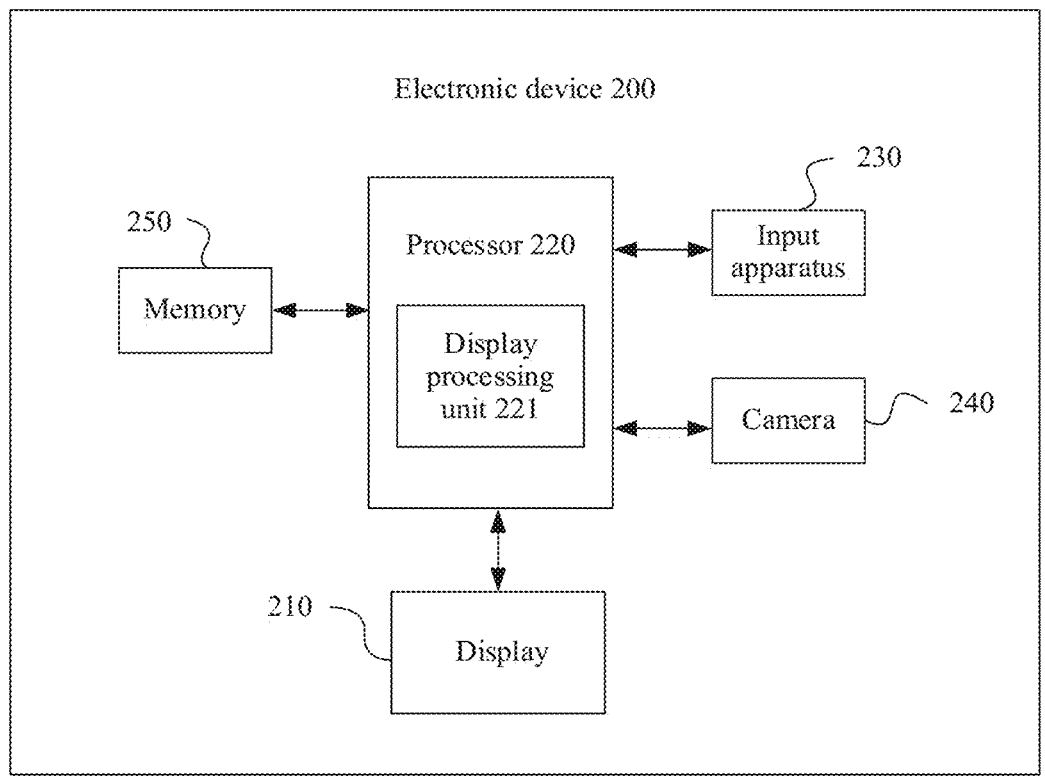
FIG. 8 is a schematic structural diagram of an electronic device according to embodiment 2 of this application.

FIG. 8 is a schematic structural diagram of an electronic device according to embodiment 2 of this application. As shown in FIG. 8, the electronic device 200 includes a display 210 and a processor 220, and the processor 220 includes a display processing unit 221.

The display processing unit 221 is configured to: obtain a to-be-displayed image, obtain, based on a first color mode, a target 3D lookup table for adjusting the to-be-displayed image, and map a color of the to-be-displayed image based on the target 3D lookup table, to obtain an adjusted image.

The display 210 is configured to display the image adjusted by the display processing unit.

In an example manner, the electronic device 200 further includes an input apparatus 230. The input apparatus 230 is configured to input, by a user, a color mode selection operation, where the first color mode is a color mode selected through the color mode selection operation. The processor 220 is configured to receive the color mode selection operation input by the user by using the input apparatus 230. The display processing unit 221 is specifically configured to: determine, based on the first color mode, an index of the target 3D lookup table corresponding to the first color mode; and search for the target 3D lookup table based on the index of the target 3D lookup table.

The input apparatus 230 may be a touchscreen, and the touchscreen may further have a display function. Therefore, the input apparatus 230 may be a display of the electronic device. The input apparatus 230 may alternatively be a mouse. When the electronic device is a personal computer, the user may select a color mode by using the mouse. The input apparatus 230 may alternatively be a microphone, and the user selects a color mode in a voice manner. This is merely an example for description, and does not constitute a limitation on the input apparatus 230.

In an example manner, the target 3D lookup table is generated based on a first 3D lookup table and a second 3D lookup table. The first 3D lookup table is used to correct a color of the display, the second 3D lookup table is used to adjust a color of an image, and the second 3D lookup table corresponds to a color mode.

In an example manner, the display processing unit 221 is specifically configured to: obtain a first 3D lookup table, where the first 3D lookup table is used to correct a color of the display; obtain a second 3D lookup table based on an application that currently plays the to-be-displayed image, where the second 3D lookup table is used to adjust a color of an image played by the application, and a color mode used by the application is the first color mode; and generate the target 3D lookup table based on the first 3D lookup table and the second 3D lookup table.

In an example manner, the electronic device 200 further includes a camera 240. The camera 240 is configured to shoot the to-be-displayed image, and the display processing unit 221 is specifically configured to receive the to-be-displayed image that is shot in real time by the camera 240.

In an example manner, the electronic device 200 further includes a memory 250. The memory 250 is configured to store the to-be-displayed image. The display processing unit 221 is specifically configured to obtain the to-be-displayed image from the memory 250.

In an example, the display processing unit 250 is further configured to: obtain a first to-be-displayed image, and perform color adjustment on the first to-be-displayed image based on the first 3D lookup table, to obtain an adjusted first to-be-displayed image. The first 3D lookup table is used to correct the color of the display. The display 210 is further configured to display the first to-be-displayed image adjusted by the display processing unit.

In an example manner, an internal memory is disposed in the display processing unit 221, and the target 3D lookup table is stored in the internal memory.

In another example manner, an internal memory is disposed in the display processing unit 221, and the first 3D lookup table and the second 3D lookup table are stored in the internal memory.

It may be understood that FIG. 8 is merely a schematic diagram. The electronic device may further include more components such as an antenna, a wireless communications module, a microphone, and a sensor.

The electronic device in this embodiment may be configured to perform the method in embodiment 1. A specific implementation is similar, and details are not described herein again.

Figure 9:
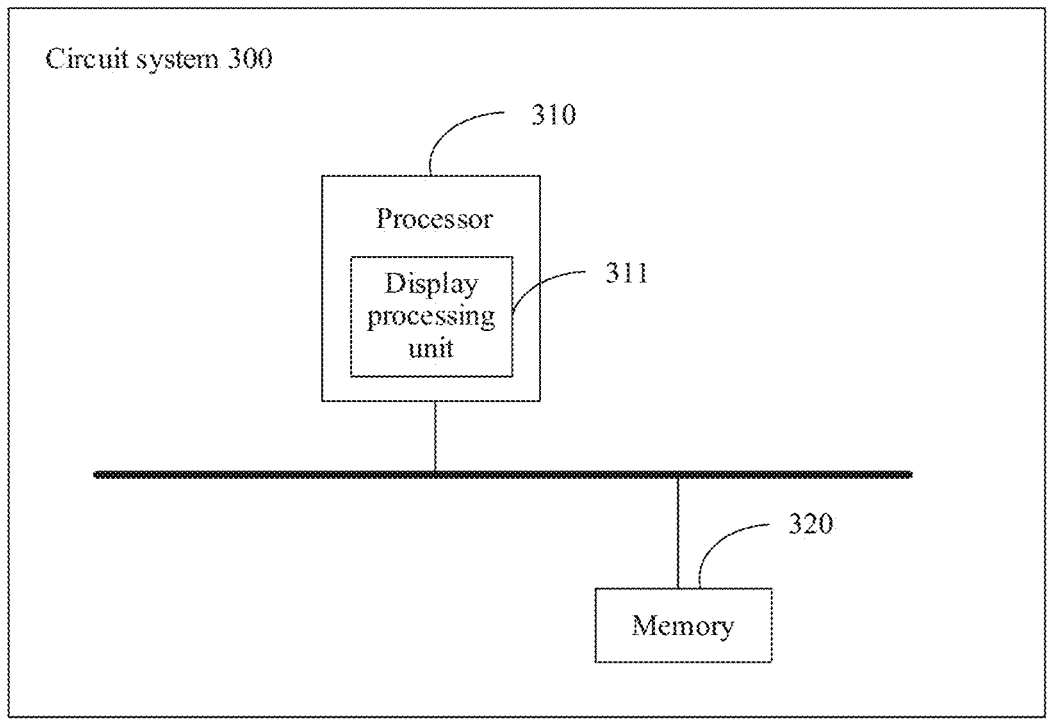
FIG. 9 is a schematic structural diagram of a circuit system according to embodiment 3 of this application.

FIG. 9 is a schematic structural diagram of a circuit system according to embodiment 3 of this application. As shown in FIG. 9, the circuit system 300 includes a processor 310, the processor 310 includes a display processing unit 311, and the display processing unit 311 is configured to: obtain a to-be-displayed image; obtain, based on a first color mode, a target 3D lookup table used to adjust the to-be-displayed image; map a color of the to-be-displayed image based on the target 3D lookup table, to obtain an adjusted image; and send the adjusted image to a display connected to the circuit system 300 for displaying.

In an example manner, the processor 310 is further configured to receive a color mode selection operation input by a user, where the first color mode is a color mode selected through the color mode selection operation. The display processing unit is specifically configured to: determine, based on the first color mode, an index of the target 3D lookup table corresponding to the first color mode; and search for the target 3D lookup table based on the index of the target 3D lookup table.

In an example manner, the target 3D lookup table is generated based on a first 3D lookup table and a second 3D lookup table. The first 3D lookup table is used to correct a color of the display, the second 3D lookup table is used to adjust a color of an image, and the second 3D lookup table corresponds to a color mode.

In an example manner, the display processing unit 311 is specifically configured to:

obtain a first 3D lookup table, where the first 3D lookup table is used to correct a color of the display; obtain a second 3D lookup table based on an application that currently plays the to-be-displayed image, where the second 3D lookup table is used to adjust a color of an image played by the application, and a color mode used by the application is the first color mode; and generate the target 3D lookup table based on the first 3D lookup table and the second 3D lookup table.

In an example manner, the display processing unit 311 is specifically configured to receive the to-be-displayed image that is shot in real time by a camera connected to the circuit system 300.

In another example manner, the circuit system 300 further includes a memory 320. The memory 320 is configured to store the to-be-displayed image. The display processing unit 311 is specifically configured to obtain the to-be-displayed image from the memory 320.

It may be understood that the memory 320 is further configured to store data or a program.

In an example, the display processing unit 311 is further configured to: obtain a first to-be-displayed image; perform color adjustment on the first to-be-displayed image based on the first 3D lookup table, to obtain an adjusted first to-be-displayed image, where the first 3D lookup table is used to correct the color of the display; and send the adjusted first to-be-displayed image to the display.

In an example manner, an internal memory is disposed in the display processing unit 311, and the target 3D lookup table is stored in the internal memory.

In another example manner, an internal memory is disposed in the display processing unit 311, and the first 3D lookup table and the second 3D lookup table are stored in the internal memory.

The circuit system in this embodiment may be applied to an electronic device, so that the electronic device is configured to perform the method in embodiment 1. A specific implementation is similar, and details are not described herein again.

For same or similar parts in this application, refer to these embodiments. Each embodiment focuses on a difference from other embodiments. Especially, an apparatus embodiment is basically similar to a method embodiment, and therefore is described briefly. For related parts, refer to partial descriptions in the method embodiment. The described apparatus embodiment is merely an example. The units described as separate parts may or may not be physically separate, and parts displayed as units may or may not be physical units, may be located in one position, or may be distributed on a plurality of network units. A part or all of the modules may be selected based on actual requirements to achieve the objectives of the solutions of the embodiments. A person of ordinary skill in the art may understand and implement the embodiments of the present invention without creative efforts.

What is claimed is:

1. A method implemented by an electronic device, the method comprising:
    receiving a color mode selection operation from a user;
    selecting, based on the color mode selection operation, a first color mode;
    generating based on a first three-dimensional (3D) lookup table and a second 3D lookup table, a target 3D lookup table, wherein the first 3D lookup table is configured to correct a first color of a display of the electronic device, wherein the second 3D lookup table is configured to adjust a second color of an image, and wherein the second 3D lookup table corresponds to the first color mode;
    obtaining, based on the first color mode, an index of the target 3D lookup table corresponding to the first color mode;
    searching, based on the index, for the target 3D lookup table configured to adjust a to-be-displayed image;
    obtaining the to-be-displayed image;
    mapping, based on the target 3D lookup table, a third color of the to-be-displayed image to obtain an adjusted image; and
    sending the adjusted image to the display of the electronic device.

2. The method of claim 1, wherein obtaining the to-be-displayed image comprises receiving the to-be-displayed image in real time from a camera of the electronic device.

3. The method of claim 1, wherein obtaining the to-be-displayed image comprises obtaining the to-be-displayed image from a memory.

4. The method of claim 1, further comprising storing the target 3D lookup table in an internal memory of the electronic device.

5. The method of claim 1, further comprising storing the first 3D lookup table and the second 3D lookup table in an internal memory of the electronic device.

6. The method of claim 1, wherein the electronic device provides a plurality of color modes, and wherein receiving the color mode selection operation comprises receiving, from the user, a selection of one of the plurality of color modes.

7. The method of claim 6, wherein receiving the selection of the one of the plurality of color modes comprises receiving the selection before playing a video.

8. The method of claim 6, wherein receiving the selection of the one of the plurality of color modes comprises receiving the selection during playing a video.

9. The method of claim 1, wherein the electronic device provides one color mode, and wherein receiving the color mode selection operation comprises using a default color mode as the first color mode.

10. The method of claim 1, wherein receiving the color mode selection operation comprises receiving the color mode selection operation comprises receiving the color mode selection operation from a video player application.

11. The method of claim 1, wherein receiving the color mode selection operation comprises receiving the color mode selection operation comprises receiving the color mode selection operation from a camera application.

12. The method of claim 1, wherein receiving the color mode selection operation comprises receiving the color mode selection operation comprises receiving the color mode selection operation from a short video application.

13. An electronic device, comprising:
    a memory configured to store computer-executable instructions; and
    one or more processors coupled to the memory and configured to execute the instructions to cause the electronic device to be configured to:
        receive a color mode selection operation from a user;
        select, based on the color mode selection operation, a first color mode;
        generate, based on a first three-dimensional (3D) lookup table and a second 3D lookup table, a target 3D lookup table, wherein the first 3D lookup table is configured to correct a first color of a display of the electronic device, wherein the second 3D lookup table is configured to adjust a second color of an image, and wherein the second 3D lookup table corresponds to the first color mode;
        obtain, based on the first color mode, an index of the target 3D table corresponding to the first color mode;
        search, based on the index, for the target 3D lookup table configured to adjust a to-be-displayed image;
        obtain the to-be-displayed image;
        map, based on the target 3D lookup table, a third first color of the to-be-displayed image to obtain an adjusted image; and
        display the adjusted image.

14. The electronic device of claim 13, further comprising a camera configured to shoot the to-be-displayed image, wherein the one or more processors are is further configured to receive the to-be-displayed image in real time from the camera.

15. The electronic device of claim 13, wherein the memory is configured to store the to-be-displayed image, and wherein the one or more processors are further configured to obtain the to-be-displayed image from the memory.

16. The electronic device of claim 13, further comprising an internal memory disposed in the one or more processors, wherein the target 3D lookup table is stored in the internal memory.

17. The electronic device of claim 13, further comprising an internal memory disposed in the one or more processors, wherein the first 3D lookup table and the second 3D lookup table are stored in the internal memory.

18. A circuit system, comprising:
 a first processor configured to receive a color mode selection operation from a user; and
 a display processor coupled to the first processor and configured to:
  select, based on the color mode selection operation, a first color mode;
  generate based on a first three-dimensional (3D) lookup table and a second 3D lookup table, a target 3D lookup table, wherein the first 3D lookup table is configured to correct a first color of a display, wherein the second 3D lookup table is configured to adjust a second color of an image, and wherein the second 3D lookup table corresponds to the first color mode;
  obtain, based on the first color mode, an index of the target 3D lookup table corresponding to the first color mode;
  search, based on the index, for the target 3D lookup table configured to adjust a to-be-displayed image;
  obtain the to-be-displayed image;
  map, based on the target 3D lookup table, a third first color of the to-be-displayed image to obtain an adjusted image; and
  send the adjusted image to the display.

19. The circuit system of claim 18, wherein the display processor is further configured to obtain the to-be-displayed image in real time from a camera.

20. The circuit system of claim 18, wherein the display processor is further configured to obtain the to-be-displayed image from a memory.

* * * * *

UNITED STATES PATENT AND TRADEMARK OFFICE
CERTIFICATE OF CORRECTION

| | |
|---|---|
| PATENT NO. | : 12,254,531 B2 |
| APPLICATION NO. | : 17/640042 |
| DATED | : March 18, 2025 |
| INVENTOR(S) | : Xiufeng Zhang |

It is certified that error appears in the above-identified patent and that said Letters Patent is hereby corrected as shown below:

In the Claims

Claim 13, Column 22, Line 58: "3D table corresponding" should read "3D lookup table corresponding"

Claim 13, Column 22, Lines 62-63: "a third first color" should read "a third color"

Claim 18, Column 24, Lines 13-14: "a third first color" should read "a third color"

Signed and Sealed this
Sixth Day of May, 2025

Coke Morgan Stewart
*Acting Director of the United States Patent and Trademark Office*